(12) United States Patent
Xue et al.

(10) Patent No.: US 11,812,412 B2
(45) Date of Patent: Nov. 7, 2023

(54) CONTROL INFORMATION TRANSMISSIONS FOR SIDE-LINK COMMUNICATION

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Junyi Li, Franklin Park, NJ (US); Juan Montojo, San Diego, CA (US); Peter Gaal, San Diego, CA (US); Tao Luo, San Diego, CA (US); Ozcan Ozturk, San Diego, CA (US); Piyush Gupta, Bridgewater, NJ (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/302,289

(22) Filed: Apr. 29, 2021

(65) Prior Publication Data

US 2021/0410113 A1    Dec. 30, 2021

Related U.S. Application Data

(60) Provisional application No. 63/045,554, filed on Jun. 29, 2020.

(51) Int. Cl.
*H04W 72/02* (2009.01)
*H04W 72/0446* (2023.01)
*H04W 72/20* (2023.01)
*H04W 72/52* (2023.01)

(52) U.S. Cl.
CPC ....... *H04W 72/02* (2013.01); *H04W 72/0446* (2013.01); *H04W 72/20* (2023.01); *H04W 72/52* (2023.01)

(58) Field of Classification Search
CPC ............. H04W 72/02; H04W 72/0406; H04W 72/0446; H04W 72/0486
See application file for complete search history.

(56) References Cited

U.S. PATENT DOCUMENTS

| | | | |
|---|---|---|---|
| 11,452,078 B2* | 9/2022 | Cao | H04W 4/46 |
| 2018/0098322 A1* | 4/2018 | Yoon | H04W 72/0446 |
| 2020/0296796 A1* | 9/2020 | Uchiyama | H04W 28/26 |
| 2021/0219268 A1* | 7/2021 | Li | H04L 1/1887 |
| 2021/0274545 A1* | 9/2021 | Adjakple | H04W 72/21 |
| 2021/0410113 A1* | 12/2021 | Xue | H04W 72/20 |

* cited by examiner

*Primary Examiner* — Raj Jain
(74) *Attorney, Agent, or Firm* — QUALCOMM Incorporated

(57) ABSTRACT

Various aspects of the present disclosure generally relate to wireless communication. In some aspects, a wireless communication device may transmit a sidelink control information message that dynamically allocates a resource pool for one or more user equipment to transmit control information to the wireless communication device. Numerous other aspects are provided.

30 Claims, 8 Drawing Sheets

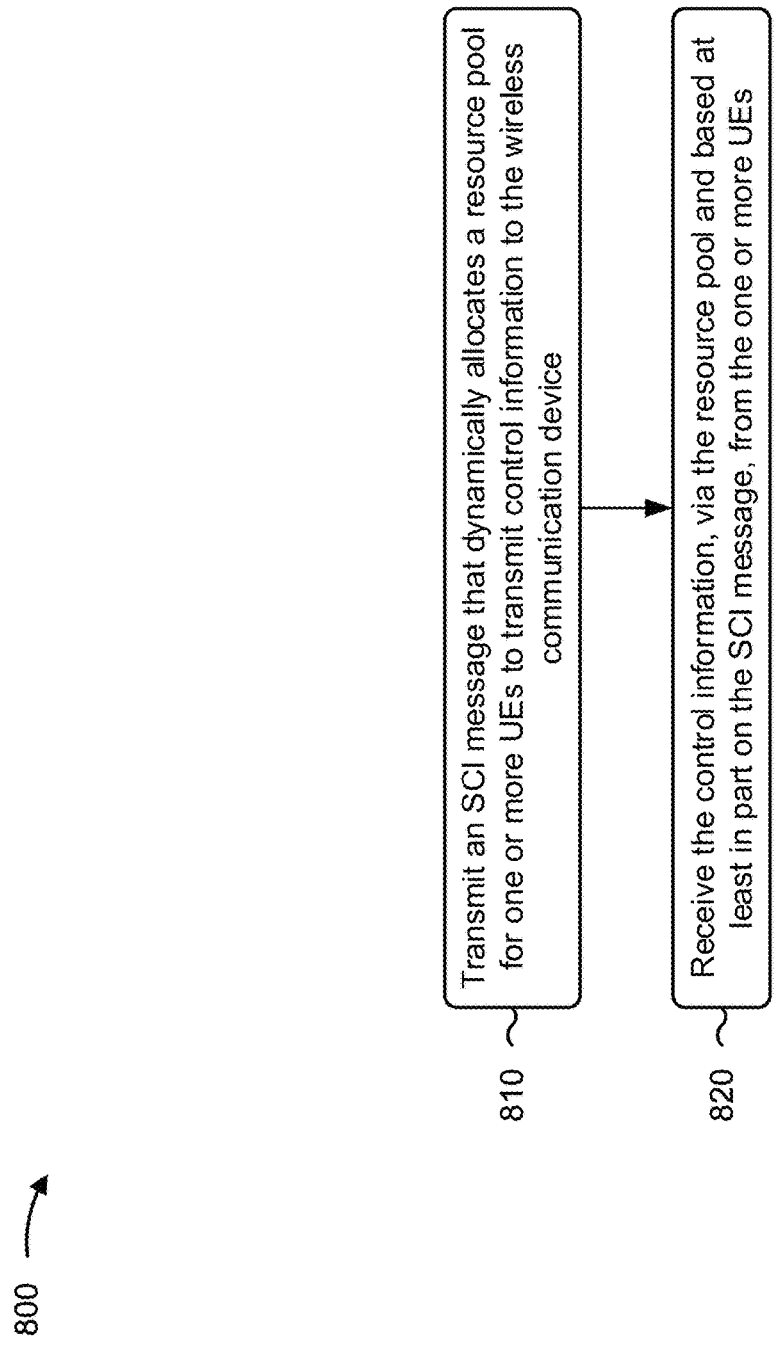

CONTROL INFORMATION TRANSMISSIONS FOR SIDE-LINK COMMUNICATION

CROSS-REFERENCE TO RELATED APPLICATION

This patent application claims priority to Provisional Patent Application No. 63/045,554, filed on Jun. 29, 2020, entitled "CONTROL INFORMATION TRANSMISSIONS FOR SIDE-LINK COMMUNICATION," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for control information transmissions for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless communication device, may include transmitting a sidelink control information (SCI) message that dynamically allocates a resource pool for one or more user equipment (UEs) to transmit control information to the wireless communication device.

In some aspects, a UE for wireless communication may include a memory and one or more processors coupled to the memory. The memory and the one or more processors may be configured to transmit an SCI message that dynamically allocates a resource pool for one or more UEs to transmit control information to the wireless communication device. The memory and the one or more processors may be configured to receive the control information, via the resource pool and based at least in part on the SCI message, from the one or more UEs. In some aspects, the wireless communication device may perform or implement any one or more of the aspects described in connection with the method described above or elsewhere herein.

In some aspects, a non-transitory computer-readable medium may store one or more instructions for wireless communication. The one or more instructions, when executed by one or more processors of a wireless communication device, may cause the one or more processors to transmit an SCI message that dynamically allocates a resource pool for one or more UEs to transmit control information to the wireless communication device; and receive the control information, via the resource pool and based at least in part on the SCI message, from the one or more UEs. In some aspects, the non-transitory computer-readable medium may perform or implement any one or more of the aspects described in connection with the method described above or elsewhere herein.

In some aspects, an apparatus for wireless communication may include means for means for transmitting an SCI message that dynamically allocates a resource pool for one or more UEs to transmit control information to the wireless communication device; and means for receiving the control information, via the resource pool and based at least in part on the SCI message, from the one or more UEs. In some aspects, the apparatus may perform or implement any one or more of the aspects described in connection with the method described above or elsewhere herein.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process associated with control information transmissions for sidelink communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
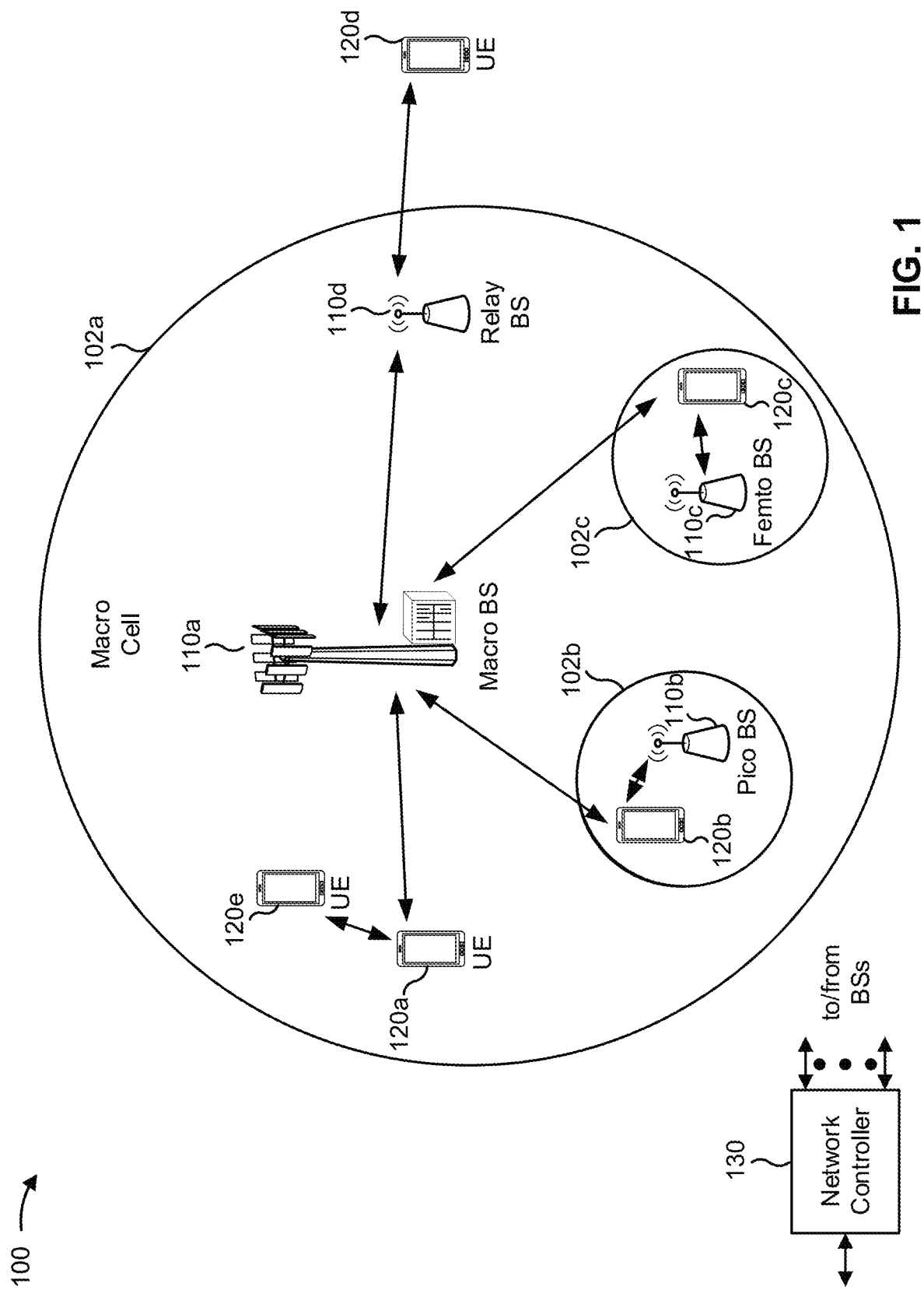
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
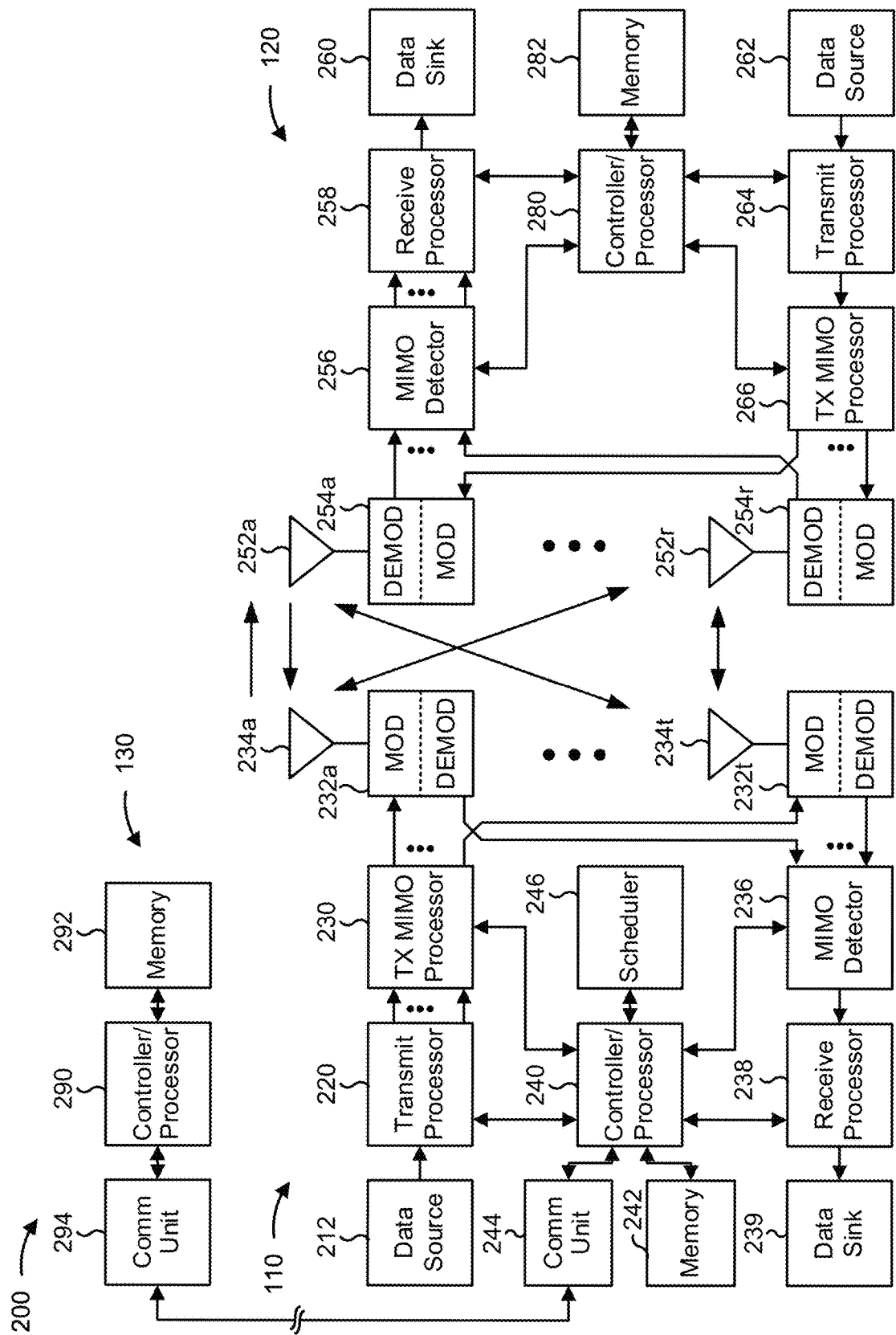
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-8).

Controller/processor 240 of base station 110, controller/processor 280 of UE 120, and/or any other component(s) of FIG. 2 may perform one or more techniques associated with control information transmissions for sidelink communication, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, a wireless communication device (e.g., UE 120, base station 110, and/or the like) may include means for transmitting an SCI message that dynamically allocates a resource pool for one or more UEs to transmit control information to the wireless communication device; means for receiving the control information, via the resource pool and based at least in part on the SCI message, from the one or more UEs, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
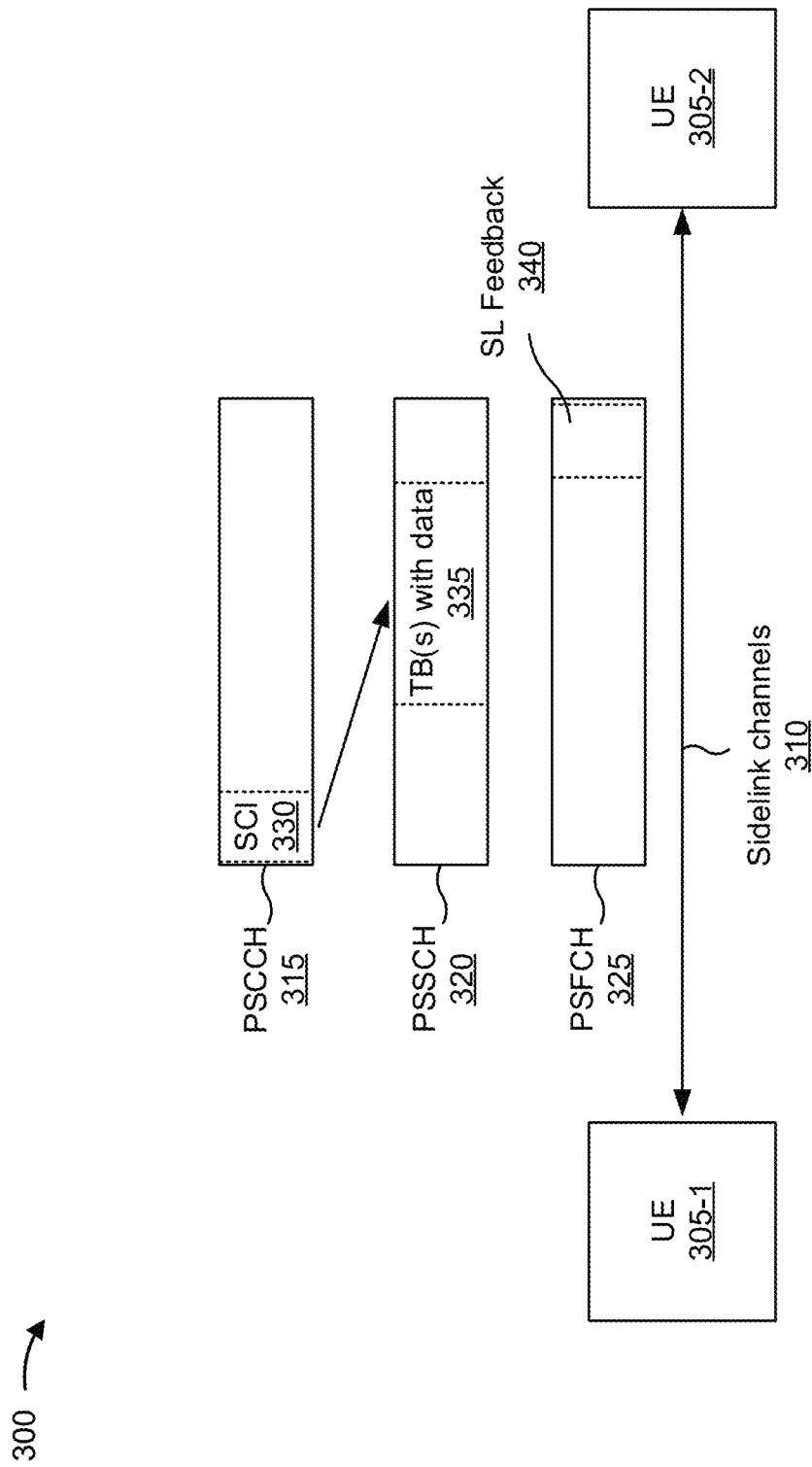
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. In some wireless networks, a transmitting device may transmit an SCI communication to occupy (e.g., reserve) one or more SL sub-channels to transmit a PSSCH communication. The transmitting device may transmit the SCI in two stages. For example, the transmitting device may transmit a first stage (stage one SCI) via a PSCCH, to be received by all peer devices with an indication of occupancy and/or reservation of one or more subchannels, and a second stage (stage two SCI) via a PSSCH, to be received by one or more targeted peers with further control information. The TB 335 may include data.

The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like. For example, the receiving device may transmit a sequence carrying a HARQ response (e.g., a 1-bit HARQ response) to a transmitting device using a resource within a common resource pool that is a configured number of slots (e.g., 2 slots) after receipt of a corresponding PSSCH communication.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure an RSRP parameter (e.g., a PSSCH-RSRP parameter) associated with various sidelink channels, may measure a RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
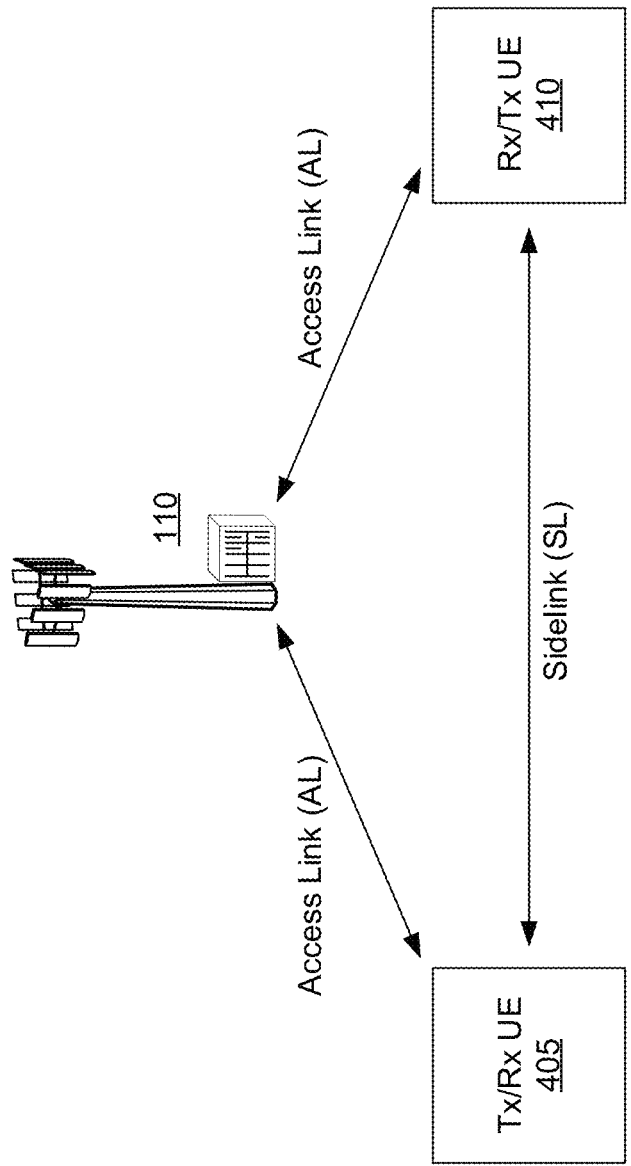
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
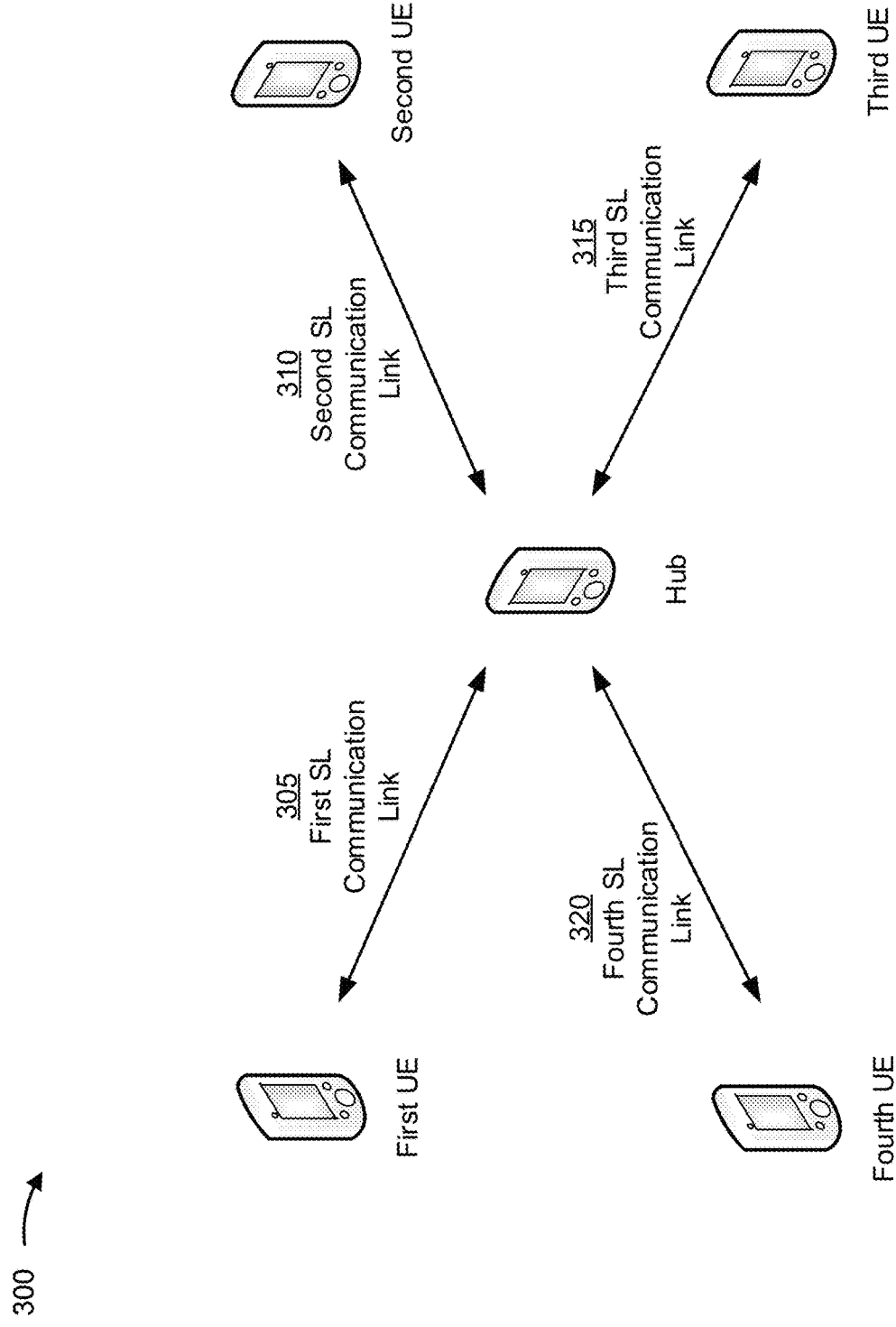
FIG. 5 is a diagram illustrating an example of sidelink communications in a start topology network, in accordance with the present disclosure.

FIG. 5 is a diagram illustrating an example of sidelink communications in a star topology network, in accordance with the present disclosure. As shown, a first UE, a second UE, a third UE, and a fourth UE ("the UEs") communicate via a hub. Although illustrated as a mobile computing device, the hub may include any type of wireless computing device, such as a UE, a base station, and/or the like.

As shown by reference numbers 305, 310, 315, and 320, a first sidelink (SL) communication link may facilitate communication between the first UE and the hub, a second SL communication link may facilitate communication between the second UE and the hub, a third SL communication link may facilitate communication between the third UE and the hub, and a fourth SL communication link may facilitate communication between the fourth UE and the hub. The UEs may communicate directly with the hub, may communicate with other UEs via the hub, and/or the like.

In this way, the hub may perform control and/or scheduling processes for the UEs to improve scheduling conflicts between the UEs. However, many networks use protocols designed for peer-to-peer topology, which may be inefficient for a star topology network. For example, a UE may use sensing (e.g., a listen-before-talk (LBT) protocol) to attempt to transmit control information (e.g., HARQ feedback) at a configured number of slots from a time of receiving a PSSCH communication. However, the channel may be occupied and the UE may be unable to transmit the control information. In another example, collisions of transmissions among the UEs may occur based at least in part on using Mode 2 channel access (e.g., where a UE conducts sensing to autonomously occupy and/or reserve channel access before transmitting). Additionally, or alternatively, Type 1 LBT-based inter-UE blocking may occur in an unlicensed band. Further, a UE may be forced to rely on blind retransmissions based at least in part on half-duplex deafness of the hub.

Some networks are aware of a star topology and may use reserve-link scheduling via upper layer protocols over a physical layer or medium access control (MAC) layer of a network. For example, the hub may announce the hub's designation as a hub in an application layer and use upper layer protocols to perform one or more control operations. The one or more control operations may include probing for traffic-related information from UEs, scheduling transmissions from multiple UEs without collisions (e.g., using upper layer based scheduling, such as radio network controller based scheduling in UMTS networks), scheduling wakeup timing for one or more of the UEs for power saving, and/or the like.

However, the networks that are aware of a star topology may have low efficiency, based at least in part on inefficiencies in transmissions of control information from the UEs to the hub (e.g., control information in a reverse link direction). For example, a UE may occupy at least one subchannel (e.g., 10 RBs×1 slot) to transmit control information, which may include only several bytes of data. This may waste a large amount of network resources to transmit a small data packet.

In another example, a UE may need to sense a channel for a sufficiently long time to safely occupy the subchannel (e.g., in Mode 2) or to transmit a scheduling request to a base station for resources to transmit the control information to the hub (e.g., in Mode 1). This may delay transmission of the control information, which may make the control information stale by the time the UE transmits the control information, and/or may consume power resources to sense the channel and/or to transmit a scheduling request to the base station.

As indicated above, FIG. 5 is provided as an example. Other examples may differ from what is described with respect to FIG. 5.

In some aspects described herein, a network (e.g., with a star topology) may use a mechanism for polling for control information. In some aspects, a hub may occupy, or partially occupy, one or more subchannels to poll for control information. The polling may include transmitting a first portion of SCI (e.g., a stage one SCI) to occupy the channel and/or to indicate a second portion of SCI (e.g., a stage two SCI). The stage two SCI may include information for polling for transmitting the control information. In some aspects, the second portion of the SCI may allocate a first resource pool with pre-assigned resources, a second pool that may be dynamically allocated, and/or the like.

In some aspects, one or more UEs (e.g., peripheral UEs) may transmit control information (e.g., sequence-based control information, a PSFCH message, a scheduling request, and/or the like) using the first resource pool based at least in part on a pre-assigned allocation of resources, using resources of the second resources pool and with a sequence that is based at least in part on an indication in the second portion of the SCI.

Based at least in part on using the mechanism for polling for control information, a UE may transmit control information without wasting a full subchannel of network resources, and the UE may transmit the control information with lower latency when compared to performing a sensing process or transmitting a scheduling request to a base station before transmitting the control information.

Figure 6:
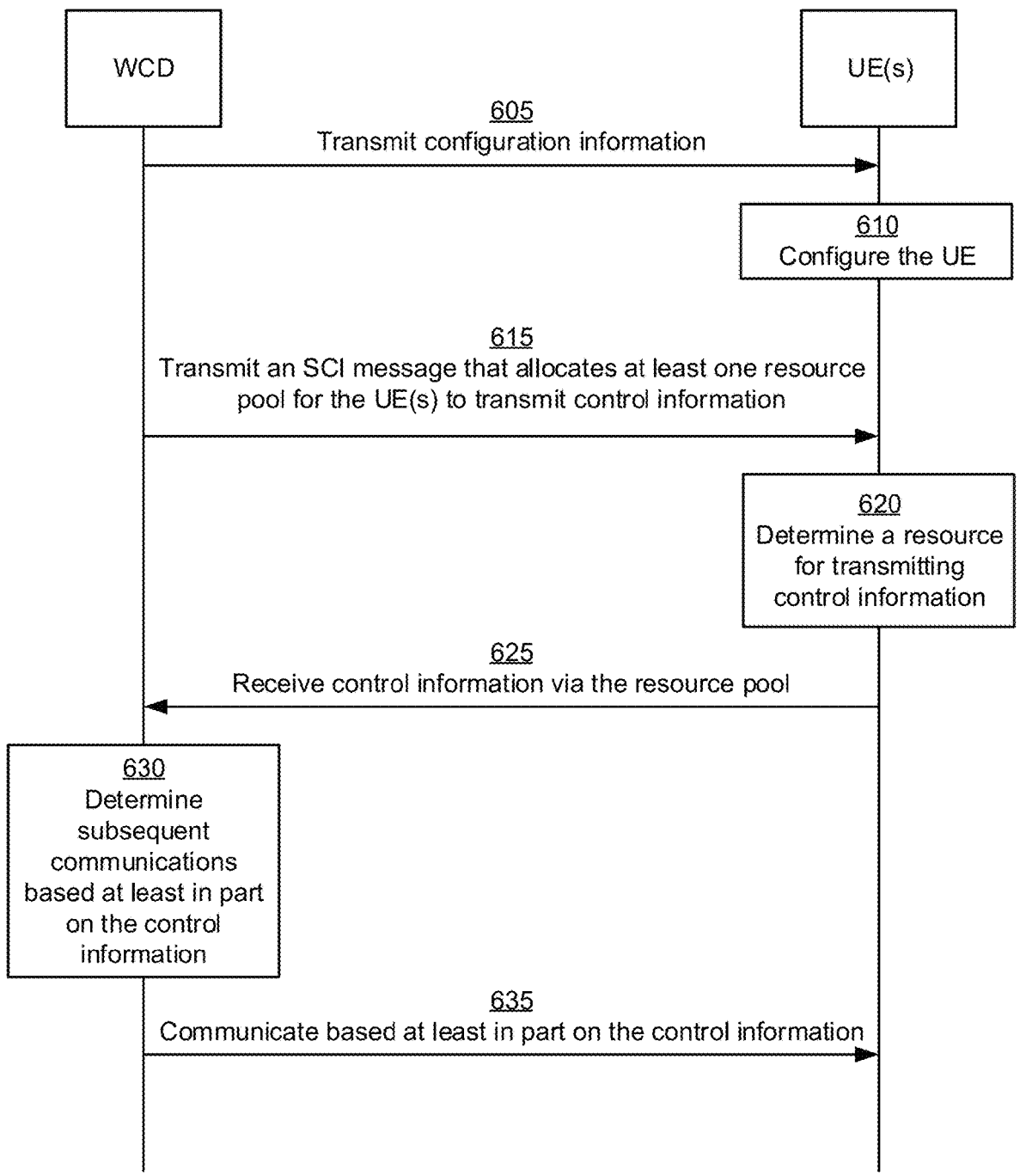
FIGS. 6 and 7 are diagrams illustrating examples associated with control information transmissions for sidelink communication, in accordance with the present disclosure.

FIG. 6 is a diagram illustrating an example 600 associated with control information transmissions for sidelink communication. As shown in FIG. 6, a wireless communication device (e.g., UE 120, base station 110, and/or the like) may communicate with one or more UEs (e.g., UE 120). The wireless communication device (WCD) and the one or more UEs may be part of a wireless network (e.g., wireless network 100). In some aspects, the WCD may be configured to operate as a hub for the one or more UEs within the network (e.g., in a star topology).

As shown by reference number 405, the WCD may transmit, and the one or more UEs may receive, configuration information. In some aspects, the one or more UEs may receive the configuration information from another device (e.g., from a base station, another UE, and/or the like), from a specification of a communication standard, and/or the like. In some aspects, the one or more UEs may receive the configuration information via one or more of radio resource control (RRC) signaling, MAC signaling (e.g., MAC control elements (MAC CEs)), downlink control information (DCI), SCI, and/or the like. In some aspects, the configuration information may include an indication of one or more configuration parameters (e.g., already known to the one or more UEs) for selection by the one or more UEs, explicit configuration information for the one or more UEs to use to configure the one or more UEs, and/or the like.

In some aspects, the configuration information may indicate that the WCD is configured as a hub (e.g., an SL hub) to manage communications among the one or more UEs. In some aspects, the configuration information may indicate that the one or more UEs are to receive an SCI message from the WCD that allocates at least one resource pool for the one or more UEs to transmit control information. In some aspects, the control information may assign one or more resources within a resource pool to the one or more UEs.

As shown by reference number 610, the one or more UEs may configure the one or more UEs for communicating with WCD. In some aspects, the one or more UEs may configure the one or more UEs based at least in part on the configuration information. In some aspects, the one or more UEs may be configured to perform one or more operations described herein.

As shown by reference number 615, the WCD may transmit, and the one or more UEs may receive, an SCI message that allocates at least one resource pool for the one or more UEs to transmit control information. In some aspects, the WCD may transmit the SCI message via a PSSCH or outside of the PSSCH. In other words, the WCD may transmit the SCI with a portion (e.g., a stage two SCI) that allocates the resource pool and a portion (e.g., another stage two SCI) that is associated with a PSSCH transmission.

In some aspects, the SCI message may include a first portion (e.g., a stage one SCI) and a second portion (e.g., stage two SCI). In some aspects, the SCI message may include SCI that dynamically allocates the resource pool within the first portion, the second portion, or both. For example, the SCI message may include a conventional stage one SCI, and carry the SCI within the stage two SCI. In some aspects, the SCI message may include a new and/or enhanced stage one SCI that includes the SCI, for example, if the resource pool includes only pre-assigned resources (e.g., resources that were previously assigned before the SCI message), if the stage two SCI is data-oriented, if the stage two SCI indicates a shortened PSSCH, and/or the like. In some aspects, the stage one SCI may be omitted and the SCI message may only include the stage two SCI.

In some aspects, the stage one SCI may include an indication that the stage two SCI includes the SCI and/or identifications of the one or more UEs to which the SCI is directed, which may allow other UEs to ignore the SCI and conserve power (e.g., in a micro-sleep mode).

In some aspects, the stage one SCI may include the SCI, an indication that the stage two SCI includes the SCI, identifications of the one or more UEs to which the SCI is directed based at least in part on adding new bits to a stage one SCI (e.g., an SCI-1 in Release 16), scrambling the stage one SCI to provide an indication or identification, and/or the like.

In some aspects, the SCI may define an intra-slot resource pool (e.g., a resource pool that is within a same slot as the SCI message) and/or a cross-slot resource pool (e.g., a resource pool that is in a subsequent slot). In some aspects, a stage one SCI of a first slot may include an indication of a reservation of a subsequent slot and/or subchannel.

In some aspects, the SCI (e.g., within the stage one SCI or stage two SCI) may define a resource pool for transmitting control information (e.g., sequence-based control information) within a second slot. In some aspects, this may be used in an unlicensed band to allow the one or more UEs to use Type2C LBT to transmit the control information. Additionally, or alternatively, the SCI may define a resource pool within the first slot. In some aspects, the resource pool within the first slot may be used by high-capability UEs that can process the SCI in time to transmit during the first slot.

In some aspects, the SCI may include a bitmap-based indication (e.g., within stage two SCI) that indicates which of the one or more UEs are to transmit the control information. For example, each of the one or more UEs (e.g., MUEs) may be assigned an ID (e.g., by the WCD) and there may be N polling occasions (e.g., a number of locations×a number of sequences). The WCD may transmit (e.g., in stage two SCI) an M-length bitmap including no more than N indications of polling a UE (e.g., a "1" may be configured to indicate polling for an associated UE). In some aspects, the polling occasions may be ordered, to correspond to an order of the indications of polling (e.g., a first ordered indication of polling assigns a UE to a first ordered occasion, a second ordered indication of polling assigns a UE to a second ordered occasion, and/or the like).

In some aspects, the SCI may allocate multiple resource pools for the one or more UEs to transmit the control information to the WCD. For example, the SCI may allocate multiple resource pools in different slots and/or may assign a first subset of the one or more UEs to transmit the control information in a first resource pool and a second subset of the one or more UEs to transmit control information in a second resource pool. In some aspects, the SCI may allocate a first resource pool including only resources that are pre-assigned to the one or more UEs and/or a second resource pool including resources that are unassigned.

In some aspects, the SCI may cancel one or more assignments associated with a subset of resources within a resource pool that includes a set of pre-assigned resources. In some aspects, the SCI may assign (e.g., to one or more different UEs of the one or more UEs) one or more resources of the subset of the set of resources. For example, the SCI may indicate which pre-assigned resources to re-collect using a bitmap indication. The bitmap may be mapped to resources within the resource pool, to the one or more UEs, and/or the like.

The resource pool may include orthogonal resource units configured to be shared by the one or more UEs to transmit control information (e.g., sequence-based control information). In some aspects, the sequence may be similar to a PSFCH sequence that may occupy 1 RB×1 symbol.

The resource pool may be orthogonal from a PSFCH pool. For example, the resource pool may be allocated to one or more symbols that are allocated to one or more symbols that are earlier within a slot than the PSFCH pool, or the resource pool may be allocated in place of the PSFCH pool in a slot without the PSFCH pool.

For a resource pool that includes pre-assigned resources, the one or more UEs may receive an assignment based at least in part on a hashing function with inputs that include a slot number, a UE identification, an identification of the WCD, an indication of a sequence to use for transmitting the control information, and/or the like. In some aspects, the one or more UEs may receive the assignment via RRC signaling (e.g., PC5-RRC signaling). In some aspects, based at least in part on the resource pool including pre-assigned resources, the WCD may transmit the SCI message without additional assignments, with assignments for fewer than all resource units, and/or the like. For example, the WCD may transmit the SCI message (e.g., within the stage one SCI) with only a time domain resource allocation (TDRA) and a frequency domain resource allocation (FDRA) of the resource pool without further assignment information, with only re-collection and/or reassignment information, and/or the like. In some aspects, the SCI may indicate the TDRA and/or the FDRA via an indication associated with an index in a table that is accessible to the one or more UEs (e.g., within a communication standard).

In some aspects, a first set of the one or more UEs may be configured to transmit the control information via a first subset of multiple resource pools, and a second set of the one or more UEs may be configured to transmit the control information via a second subset of the multiple resource pools. For example, the first set of the one or more UEs and the second set of the one or more UEs may be configured to transmit control information in alternating resource pools of the multiple resource pools. The WCD may indicate whether a set of the one or more UEs is to transmit control information within a resource pool based at least in part on modifying the hashing function with inputs as described above, RRC signaling, using a time-frequency mask, scrambling a sequence of the SCI message, and/or the like.

In some aspects, the SCI may define a dynamic resource pool. For example, the SCI may indicate which of the one or more UEs are polled to transmit the control information, resource locations for the one or more UEs to use to transmit the control information, sequences for the one or more UEs to use to transmit the control information, and/or the like.

As shown by reference number 620, the one or more UEs may determine a resource for transmitting control information. For example, the one or more UEs may use the SCI message to determine whether the UE is polled to transmit control information, what resources the one or more UEs are to use to transmit the control information, sequences for the one or more UEs to use to transmit the control information, and/or the like. In some aspects, the one or more UEs may use the SCI message in combination with pre-assignment information to determine the resource for transmitting the control information.

As shown by reference number 625, the WCD may receive, and the one or more UEs may transmit, the control information via the resource pool. In some aspects, the control information may include a scheduling request. For example, a UE may transmit a scheduling request via the resource pool instead of performing a sensing process before attempting to transmit the scheduling request and/or risking collisions during a temporal busy period. In some aspects, the WCD and/or a base station may configure a polling subchannel for scheduling requests after a wakeup instance for a set of the one or more UEs (e.g., to allow the set of one or more UEs to remain in power saving mode until the wakeup instance). In some aspects, the WCD may configure a polling subchannel based at least in part on detecting an occupancy (e.g., including SCI failures) of non-scheduled subchannels that satisfies a threshold.

In some aspects, the WCD may transmit the SCI message to poll for low-bit buffer status reports (BSRs). A BSR with at least 2 bits may be supported based at least in part on using Quadrature Phase Shift Keying (QPSK) and coupled sequences at multiple resource locations. In some aspects, the BSR may include an indication that a measured CBR satisfies a CBR threshold, an indication, from multiple UEs of the one or more UEs, using a same set of resources, and/or the like.

In some aspects, the WCD may transmit the SCI message to poll for heart-beating indications from the one or more UEs. For example, a heart-beating indication may be a single bit, or a low bit count, indication that the one or more UEs are present within the network, that the WCD is to maintain or initiate scheduling for reverse link transmissions, that the WCD is to maintain a scheduled grant for the one or more UEs, and/or the like.

In some aspects, the WCD may transmit the SCI message to poll for forward link signal-to-interference-plus-noise related information. For example, the one or more UEs may report to the WCD that an RSSI and/or a reference signal code power (RSCP) has changed (e.g., by a threshold amount, to a threshold amount, and/or the like) since a previous report. In some aspects, the one or more UEs may request a channel state information reference signal, a beam selection process, and/or the like.

In some aspects, the WCD may transmit the SCI message to poll for indications of channel busy ratio (CBR) overloading. For example, the one or more UEs may report to the WCD that a measured CBR satisfies a CBR threshold. In some aspects, a set of multiple UEs of the one or more UEs may be configured to use a same set of resources (e.g., in a time-frequency domain) to report CBR overloading (e.g., in a single frequency network).

Based at least in part on polling for control information as described herein, a UE may transmit control information without wasting a full subchannel of network resources, and the UE may transmit the control information with lower latency when compared to performing a sensing process or transmitting a scheduling request to a base station before transmitting the control information.

As indicated above, FIG. 6 is provided as an example. Other examples may differ from what is described with respect to FIG. 6.

Figure 7:
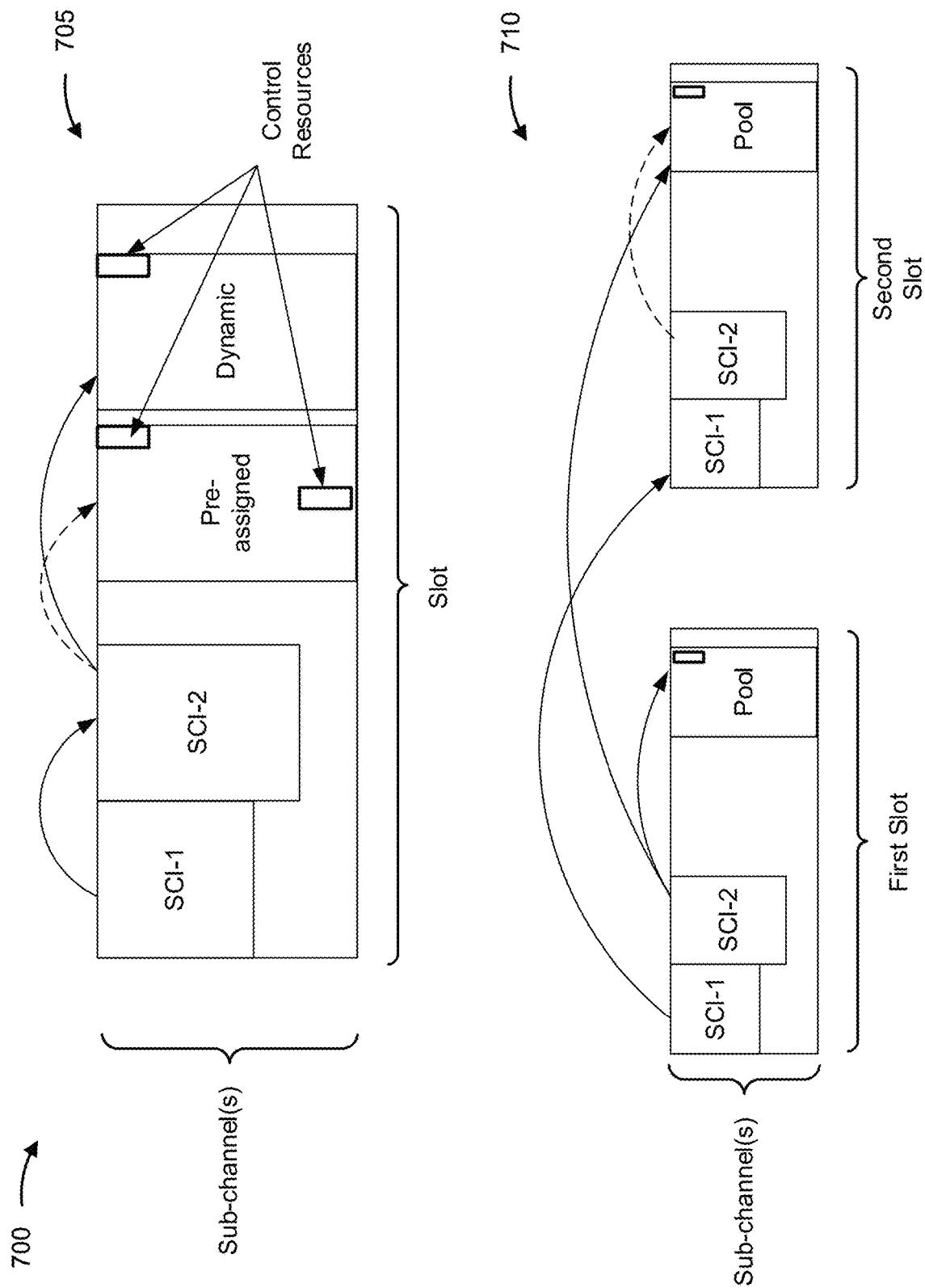

FIG. 7 is a diagram illustrating an example 700 associated with control information transmissions for sidelink communication. A wireless communication device (e.g., UE 120, base station 110, and/or the like) may communicate with one or more UEs (e.g., UE 120) as shown in FIG. 7. The wireless communication device (WCD) and the UE may be part of a wireless network (e.g., wireless network 100). In some aspects, the WCD may be configured to operate as a hub for the one or more UEs within the network (e.g., in a star topology).

As shown by reference number 705, an SCI message (including a stage one SCI and a stage two SCI) may allocate a resource pool for one or more UEs to transmit control information to the wireless communication device. The stage one SCI may occupy the subchannel and/or point to the stage two SCI, which may carry detailed information of a polling that may include a pre-assigned resource poll and/or a dynamic resource pool. In some aspects, the dynamic resource poll may be located later in a time domain to accommodate delay caused by processing time of the one or more UEs to decode the SCI message and prepare to transmit the control information.

In some aspects, the one or more UEs may transmit the control information via the pre-assigned resource pool based at least in part on an assignment received before the SCI message that includes an indication of resources and/or a sequence to use to transmit the control information.

In some aspects, the stage two SCI may dynamically poll the one or more UEs to transmit control information (e.g., sequence based control information) at an indicated resource location and using an indicated sequence (e.g., as indicated by the stage two SCI).

As shown by reference number 710, an SCI message may identify an intra-slot resource pool and/or an inter-slot resource pool for the one or more UEs to transmit the control information. For example, a stage one SCI of the first slot may reserve the second slot of one or more subchannels. A stage two SCI of the first slot may define a resource pool for the one or more UEs to transmit the control information in the second slot and/or may define a resource pool for the one or more UEs to transmit the control information within the first slot. In some aspects, a stage two SCI of the second slot may re-collect one or more resources of the resource pool of the second slot. In other words, the stage two SCI of the second slot may cancel a pre-assignment of resources of the resource pool of the second slot.

As indicated above, FIG. 7 is provided as an example. Other examples may differ from what is described with respect to FIG. 7.

FIG. 8 is a diagram illustrating an example process 800 performed, for example, by a WCD, in accordance with the present disclosure. Example process 800 is an example where the WCD (e.g., UE 120, base station 110, and/or the like) performs operations associated with control information transmissions for sidelink communication.

As shown in FIG. 8, in some aspects, process 800 may include transmitting an SCI message that dynamically allocates a resource pool for one or more UEs to transmit control information to the wireless communication device (block 810). For example, the WCD (e.g., using transmit processor 264, controller/processor 280, memory 282, and/or the like) may transmit an SCI message that dynamically allocates a resource pool for one or more UEs to transmit control information to the wireless communication device, as described above.

As further shown in FIG. 8, in some aspects, process 800 may include receiving the control information, via the resource pool and based at least in part on the SCI message, from the one or more UEs (block 820). For example, the WCD (e.g., using receive processor 258, controller/processor 280, memory 282, and/or the like) may receive the control information, via the resource pool and based at least in part on the SCI message, from the one or more UEs, as described above.

Process 800 may include additional aspects, such as any single aspect or any combination of aspects described below and/or in connection with one or more other processes described elsewhere herein.

In a first aspect, the resource pool comprises orthogonal resource units configured to be shared by the one or more UEs to transmit sequence-based control information, the resource pool is configured with multiple single-resource-block-per-symbol portions to carry the sequence-based control information, the resource pool is orthogonal to a PSFCH pool, or some combination thereof.

In a second aspect, alone or in combination with the first aspect, the resource pool is orthogonal to the PSFCH pool based at least in part on one or more of: an allocation of the resource pool to one or more symbols that are earlier within a slot than the PSFCH pool, or an allocation of the resource pool in place of the PSFCH pool in a slot without the PSFCH pool.

In a third aspect, alone or in combination with one or more of the first and second aspects, transmitting the SCI message includes transmitting, to a set of UEs that includes the one or more UEs, a stage 1 SCI, and transmitting, to the one or more UEs, a stage two SCI that includes information for polling for transmitting the control information.

In a fourth aspect, alone or in combination with one or more of the first through third aspects, a stage one SCI of the SCI message includes an indication, to a set of UEs that includes the one or more UEs, that a second portion of the SCI message includes information for polling for transmitting the control information.

In a fifth aspect, alone or in combination with one or more of the first through fourth aspects, transmitting the SCI message includes transmitting the SCI message within a PSSCH, or transmitting the SCI message with a first stage two SCI that is associated with a PSSCH transmission and a second stage two SCI that allocates the resource pool.

In a sixth aspect, alone or in combination with one or more of the first through fifth aspects, transmitting the SCI message includes transmitting, to a set of UEs that includes the one or more UEs, a stage one SCI that includes information for polling for transmitting the control information.

In a seventh aspect, alone or in combination with one or more of the first through sixth aspects, the SCI message includes one or more of: an allocation of the resource pool within a same slot as the SCI message, or an allocation of the resource pool within a subsequent slot.

In an eighth aspect, alone or in combination with one or more of the first through seventh aspects, the resource pool includes one or more resources that have been assigned, to the one or more UEs, previous to transmission of the SCI message.

In a ninth aspect, alone or in combination with one or more of the first through eighth aspects, the resource pool is a dynamic resource pool, the SCI message indicates, to a set of UEs that includes the one or more UEs, that the one or more UEs are polled to transmit the control information via the resource pool, the SCI message indicates an allocation of resources, within the resource pool, for respective UEs of the one or more UEs to use to transmit the control information, the SCI message indicates sequences for respective UEs of the one or more UEs to use to transmit the control information, or some combination thereof.

In a tenth aspect, alone or in combination with one or more of the first through ninth aspects, the SCI message includes an indication of an assignment, for at least one UE of the one or more UEs, of one or more resources within the resource pool to use to transmit the control information, the indication of the assignment comprises a bitmap having a bit mapped to each UE of the one or more UEs, and the bitmap indicates that the at least one UE of the one or more UEs is polled to transmit the control information.

In an eleventh aspect, alone or in combination with one or more of the first through tenth aspects, the SCI message dynamically allocates an additional resource pool for the one or more UEs to transmit the control information to the wireless communication device, and the resource pool and the additional resource pool include one or more of: a first resource pool including only resources that are previously assigned to the one or more UEs, or a second resource pool including resources that are unassigned.

In a twelfth aspect, alone or in combination with one or more of the first through eleventh aspects, the resource pool includes a set of pre-assigned resources, the SCI message cancels one or more assignments associated with a subset of the set of pre-assigned resources, the SCI message assigns one or more resources of the subset of the set of pre-assigned resources, or some combination thereof.

In a thirteenth aspect, alone or in combination with one or more of the first through twelfth aspects, the control information comprises one or more of: one or more scheduling requests for the one or more UEs, one or more buffer status reports for the one or more UEs, one or more indications to maintain a configured grant for the one or more UEs, information associated with a forward link signal-to-interference-plus-noise ratio for the one or more UEs, one or more indications of CBR overloading, or some combination thereof.

In a fourteenth aspect, alone or in combination with one or more of the first through thirteenth aspects, the one or more indications of CBR overloading include an indication that a measured CBR satisfies a CBR threshold, or an indication, from multiple UEs of the one or more UEs, using a same set of resources.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a wireless communication device, comprising: transmitting a sidelink control information (SCI) message that dynamically allocates a resource pool for one or more user equipment (UEs) to transmit control information to the wireless communication device; and receiving the control information, via the resource pool and based at least in part on the SCI message, from the one or more UEs.

Aspect 2: The method of Aspect 1, wherein the resource pool comprises orthogonal resource units configured to be shared by the one or more UEs to transmit sequence-based control information, wherein the resource pool is configured with multiple single-resource-block-per-symbol portions to carry the sequence-based control information, wherein the resource pool is orthogonal to a physical sidelink feedback channel (PSFCH) pool, or some combination thereof.

Aspect 3: The method Aspect 2, wherein the resource pool is orthogonal to the PSFCH pool based at least in part on one or more of: an allocation of the resource pool to one or more symbols that are earlier within a slot than the PSFCH pool, or an allocation of the resource pool in place of the PSFCH pool in a slot without the PSFCH pool.

Aspect 4: The method of any of Aspects 1-3, wherein transmitting the SCI message comprises: transmitting, to a set of UEs that includes the one or more UEs, a stage one SCI, and transmitting, to the one or more UEs, a stage two SCI that includes information for polling for transmitting the control information.

Aspect 5: The method of any of Aspects 1-4, wherein a stage one SCI of the SCI message includes an indication, to a set of UEs that includes the one or more UEs, that a second portion of the SCI message includes information for polling for transmitting the control information.

Aspect 6: The method of any of Aspects 1-5, wherein transmitting the SCI message comprises: transmitting the SCI message within a physical sidelink shared channel (PSSCH), or transmitting the SCI message with a first stage two SCI that is associated with a PSSCH transmission and a second stage two SCI that allocates the resource pool.

Aspect 7: The method of any of Aspects 1-6, wherein transmitting the SCI message comprises: transmitting, to a set of UEs that includes the one or more UEs, a stage one SCI that includes information for polling for transmitting the control information.

Aspect 8: The method of any of Aspects 1-7, wherein the SCI message comprises one or more of: an allocation of the resource pool within a same slot as the SCI message, or an allocation of the resource pool within a subsequent slot.

Aspect 9: The method of any of Aspects 1-8, wherein the resource pool comprises: one or more resources that have been assigned, to the one or more UEs, previous to transmission of the SCI message.

Aspect 10: The method of any of Aspects 1-8, wherein the resource pool is a dynamic resource pool, wherein the SCI message indicates, to a set of UEs that includes the one or more UEs, that the one or more UEs are polled to transmit the control information via the resource pool, wherein the SCI message indicates an allocation of resources, within the resource pool, for respective UEs of the one or more UEs to use to transmit the control information, wherein the SCI message indicates sequences for respective UEs of the one or more UEs to use to transmit the control information, or some combination thereof.

Aspect 11: The method of any of Aspects 1-10, wherein the SCI message includes an indication of an assignment, for at least one UE of the one or more UEs, of one or more resources within the resource pool to use to transmit the control information, wherein the indication of the assignment comprises a bitmap having a bit mapped to each UE of the one or more UEs, and wherein the bitmap indicates that the at least one UE of the one or more UEs is polled to transmit the control information.

Aspect 12: The method of any of Aspects 1-11, wherein the SCI message dynamically allocates an additional resource pool for the one or more UEs to transmit the control information to the wireless communication device, and wherein the resource pool and the additional resource pool comprise one or more of: a first resource pool including only resources that are previously assigned to the one or more UEs, or a second resource pool including resources that are unassigned.

Aspect 13: The method of any of Aspects 1-12, wherein the resource pool includes a set of pre-assigned resources, wherein the SCI message cancels one or more assignments associated with a subset of the set of pre-assigned resources, wherein the SCI message assigns one or more resources of the subset of the set of pre-assigned resources, or some combination thereof.

Aspect 14: The method of any of Aspects 1-13, wherein the control information comprises one or more of: one or more scheduling requests for the one or more UEs, one or more buffer status reports for the one or more UEs, one or more indications to maintain a configured grant for the one or more UEs, information associated with a forward link signal-to-interference-plus-noise ratio for the one or more UEs, one or more indications of channel busy ratio (CBR) overloading, or some combination thereof.

Aspect 15: The method of Aspect 14, wherein the one or more indications of CBR overloading comprise: an indication that a measured CBR satisfies a CBR threshold, or an indication, from multiple UEs of the one or more UEs, using a same set of resources.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
  a memory; and
  one or more processors, coupled to the memory, configured to:
    transmit a sidelink control information (SCI) message that dynamically allocates a resource pool configured for polled control information, the resource pool being configured for one or more user equipment (UEs) to transmit control information to the wireless communication device when polled to transmit the control information; and
    receive the control information, via the resource pool and based at least in part on the SCI message, from the one or more UEs.

2. The wireless communication device of claim 1, wherein the resource pool comprises orthogonal resource units configured to be shared by the one or more UEs to transmit sequence-based control information,
   wherein the resource pool is configured with multiple single-resource-block-per-symbol portions to carry the sequence-based control information,
      wherein the resource pool is orthogonal to a physical sidelink feedback channel (PSFCH) pool, or
      some combination thereof.

3. The wireless communication device of claim 2, wherein the resource pool is orthogonal to the PSFCH pool based at least in part on one or more of:
   an allocation of the resource pool to one or more symbols that are earlier within a slot than the PSFCH pool, or
   an allocation of the resource pool in place of the PSFCH pool in a slot without the PSFCH pool.

4. The wireless communication device of claim 1, wherein the one or more processors, to transmit the SCI message, are configured to:
   transmit, to a set of UEs that includes the one or more UEs, a stage one SCI, and
   transmit, to the one or more UEs, a stage two SCI that includes information for polling for transmitting the control information.

5. The wireless communication device of claim 1, wherein a stage one SCI of the SCI message includes an indication, to a set of UEs that includes the one or more UEs, that a second portion of the SCI message includes information for polling for transmitting the control information.

6. The wireless communication device of claim 1, wherein the one or more processors, to transmit the SCI message, are configured to:
   transmit the SCI message within a physical sidelink shared channel (PSSCH), or
   transmit the SCI message with a first stage two SCI that is associated with a PSSCH transmission and a second stage two SCI that allocates the resource pool.

7. The wireless communication device of claim 1, wherein the SCI message comprises one or more of:
   an allocation of the resource pool within a same slot as the SCI message, or
   an allocation of the resource pool within a subsequent slot.

8. The wireless communication device of claim 1, wherein the resource pool comprises:
   one or more resources that have been assigned, to the one or more UEs, previous to transmission of the SCI message.

9. The wireless communication device of claim 1, wherein the resource pool is a dynamic resource pool,
   wherein the SCI message indicates, to a set of UEs that includes the one or more UEs, that the one or more UEs are polled to transmit the control information via the resource pool,
      wherein the SCI message indicates an allocation of resources, within the resource pool, for respective UEs of the one or more UEs to use to transmit the control information,
         wherein the SCI message indicates sequences for respective UEs of the one or more UEs to use to transmit the control information, or
         some combination thereof.

10. The wireless communication device of claim 1, wherein the SCI message includes an indication of an assignment, for at least one UE of the one or more UEs, of one or more resources within the resource pool to use to transmit the control information,
   wherein the indication of the assignment comprises a bitmap having a bit mapped to each UE of the one or more UEs, and
   wherein the bitmap indicates that the at least one UE of the one or more UEs is polled to transmit the control information.

11. The wireless communication device of claim 1, wherein the SCI message dynamically allocates an additional resource pool for the one or more UEs to transmit the control information to the wireless communication device, and
   wherein the resource pool and the additional resource pool comprise one or more of:
      a first resource pool including only resources that are previously assigned to the one or more UEs, or
      a second resource pool including resources that are unassigned.

12. The wireless communication device of claim 1, wherein the resource pool includes a set of pre-assigned resources,
   wherein the SCI message cancels one or more assignments associated with a subset of the set of pre-assigned resources,
      wherein the SCI message assigns one or more resources of the subset of the set of pre-assigned resources, or
      some combination thereof.

13. The wireless communication device of claim 1, wherein the control information comprises one or more of:
   one or more scheduling requests for the one or more UEs,
   one or more buffer status reports for the one or more UEs,
   one or more indications to maintain a configured grant for the one or more UEs,
   information associated with a forward link signal-to-interference-plus-noise ratio for the one or more UEs,
   one or more indications of channel busy ratio (CBR) overloading, or
   some combination thereof.

14. A method of wireless communication performed by a wireless communication device, comprising:
   transmitting a sidelink control information (SCI) message that dynamically allocates a resource pool configured for polled control information, the resource pool being configured for one or more user equipment (UEs) to transmit control information to the wireless communication device when polled to transmit the control information; and
   receiving the control information, via the resource pool and based at least in part on the SCI message, from the one or more UEs.

15. The method of claim 14, wherein the resource pool comprises orthogonal resource units configured to be shared by the one or more UEs to transmit sequence-based control information,
   wherein the resource pool is configured with multiple single-resource-block-per-symbol portions to carry the sequence-based control information,
   wherein the resource pool is orthogonal to a physical sidelink feedback channel (PSFCH) pool, or
   some combination thereof.

16. The method of claim 15, wherein the resource pool is orthogonal to the PSFCH pool based at least in part on one or more of:
   an allocation of the resource pool to one or more symbols that are earlier within a slot than the PSFCH pool, or an allocation of the resource pool in place of the PSFCH pool in a slot without the PSFCH pool.

17. The method of claim 14, wherein transmitting the SCI message comprises:
    transmitting, to a set of UEs that includes the one or more UEs, a stage one SCI, and
    transmitting, to the one or more UEs, a stage two SCI that includes information for polling for transmitting the control information.

18. The method of claim 14, wherein a stage one SCI of the SCI message includes an indication, to a set of UEs that includes the one or more UEs, that a second portion of the SCI message includes information for polling for transmitting the control information.

19. The method of claim 14, wherein transmitting the SCI message comprises:
    transmitting the SCI message within a physical sidelink shared channel (PSSCH), or
    transmitting the SCI message with a first stage two SCI that is associated with a PSSCH transmission and a second stage two SCI that allocates the resource pool.

20. The method of claim 14, wherein the SCI message comprises one or more of:
    an allocation of the resource pool within a same slot as the SCI message, or
    an allocation of the resource pool within a subsequent slot.

21. The method of claim 14, wherein the resource pool comprises:
    one or more resources that have been assigned, to the one or more UEs, previous to transmission of the SCI message.

22. The method of claim 14, wherein the resource pool is a dynamic resource pool,
    wherein the SCI message indicates, to a set of UEs that includes the one or more UEs, that the one or more UEs are polled to transmit the control information via the resource pool,
    wherein the SCI message indicates an allocation of resources, within the resource pool, for respective UEs of the one or more UEs to use to transmit the control information,
    wherein the SCI message indicates sequences for respective UEs of the one or more UEs to use to transmit the control information, or
    some combination thereof.

23. The method of claim 14, wherein the SCI message includes an indication of an assignment, for at least one UE of the one or more UEs, of one or more resources within the resource pool to use to transmit the control information,
    wherein the indication of the assignment comprises a bitmap having a bit mapped to each UE of the one or more UEs, and
    wherein the bitmap indicates that the at least one UE of the one or more UEs is polled to transmit the control information.

24. The method of claim 14, wherein the SCI message dynamically allocates an additional resource pool for the one or more UEs to transmit the control information to the wireless communication device, and
    wherein the resource pool and the additional resource pool comprise one or more of:
        a first resource pool including only resources that are previously assigned to the one or more UEs, or
        a second resource pool including resources that are unassigned.

25. The method of claim 14, wherein the resource pool includes a set of pre-assigned resources,
    wherein the SCI message cancels one or more assignments associated with a subset of the set of pre-assigned resources,
    wherein the SCI message assigns one or more resources of the subset of the set of pre-assigned resources, or
    some combination thereof.

26. The method of claim 14, wherein the control information comprises one or more of:
    one or more scheduling requests for the one or more UEs,
    one or more buffer status reports for the one or more UEs,
    one or more indications to maintain a configured grant for the one or more UEs,
    information associated with a forward link signal-to-interference-plus-noise ratio for the one or more UEs,
    one or more indications of channel busy ratio (CBR) overloading, or
    some combination thereof.

27. A non-transitory computer-readable medium storing a set of instructions for wireless communication, the set of instructions comprising:
    one or more instructions that, when executed by one or more processors of a wireless communication device, cause the wireless communication device to:
        transmit a sidelink control information (SCI) message that dynamically allocates a resource pool configured for polled control information, the resource pool being configured for one or more user equipment (UEs) to transmit control information to the wireless communication device when polled to transmit the control information; and
        receive the control information, via the resource pool and based at least in part on the SCI message, from the one or more UEs.

28. The non-transitory computer-readable medium of claim 27, wherein the resource pool comprises orthogonal resource units configured to be shared by the one or more UEs to transmit sequence-based control information,
    wherein the resource pool is configured with multiple single-resource-block-per-symbol portions to carry the sequence-based control information,
    wherein the resource pool is orthogonal to a physical sidelink feedback channel (PSFCH) pool, or
    some combination thereof.

29. An apparatus for wireless communication, comprising:
    means for transmitting a sidelink control information (SCI) message that dynamically allocates a resource pool configured for polled control information, the resource pool being configured for one or more user equipment (UEs) to transmit control information to the apparatus when polled to transmit the control information; and
    means for receiving the control information, via the resource pool and based at least in part on the SCI message, from the one or more UEs.

30. The apparatus of claim 29, wherein the resource pool comprises orthogonal resource units configured to be shared by the one or more UEs to transmit sequence-based control information,
    wherein the resource pool is configured with multiple single-resource-block-per-symbol portions to carry the sequence-based control information,
    wherein the resource pool is orthogonal to a physical sidelink feedback channel (PSFCH) pool, or
    some combination thereof.

* * * * *